United States Patent  
Tallet (10) Patent No.: US 7,835,306 B2
(45) Date of Patent: Nov. 16, 2010

(54) TRANSLATING MST INSTANCES BETWEEN PORTS OF A BRIDGE IN A COMPUTER NETWORK

(75) Inventor: Francois Edouard Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 476 days.

(21) Appl. No.: 12/018,458

(22) Filed: Jan. 23, 2008

(65) Prior Publication Data

US 2009/0185571 A1    Jul. 23, 2009

(51) Int. Cl.
*H04L 12/28* (2006.01)
(52) U.S. Cl. ...................... 370/255; 370/401
(58) Field of Classification Search .............. None
See application file for complete search history.

(56) References Cited

U.S. PATENT DOCUMENTS

| 5,959,968 | A | 9/1999 | Chin et al. |
| 6,188,694 | B1 | 2/2001 | Fine et al. |
| 6,304,575 | B1 | 10/2001 | Carroll et al. |
| 6,515,969 | B1 | 2/2003 | Smith |
| 6,937,576 | B1 | 8/2005 | Di Benedetto et al. |
| 7,292,581 | B2 | 11/2007 | Finn |
| 2005/0149625 | A1* | 7/2005 | Rouyer et al. ............. 709/220 |
| 2006/0198323 | A1 | 9/2006 | Finn |
| 2006/0245436 | A1 | 11/2006 | Sajassi |
| 2007/0140147 | A1* | 6/2007 | Touve et al. ............. 370/255 |

OTHER PUBLICATIONS

U.S. Appl. No. 11/499,556, for a Technique for Sharing a Physical Port Among a Plurality of Virtual Bridges on a Switch in a Computer Network, filed Aug. 14, 2006, 33 pages.

* cited by examiner

*Primary Examiner*—Daniel J Ryman
*Assistant Examiner*—John Blanton
(74) *Attorney, Agent, or Firm*—Cesari and McKenna, LLP (57) ABSTRACT

In one embodiment, a first port of a bridge is configured for a first spanning tree (ST) and not a second ST, while a second port of the bridge is configured for the second ST and not the first ST. A multiple ST (MST) bridge protocol data unit (BPDU) for the first and second STs is generated for the first and second ports having a first portion corresponding to the first ST and a second portion corresponding to the second ST. To translate MST instances, the second portion is stripped from the MST BPDU of the first port, and the first portion from the MST BPDU of the first port is associated with the second ST. Conversely, the first portion is stripped from the MST BPDU of the second port, and the second portion from the MST BPDU of the second port is associated with the first ST.

20 Claims, 8 Drawing Sheets

TRANSLATING MST INSTANCES BETWEEN PORTS OF A BRIDGE IN A COMPUTER NETWORK

TECHNICAL FIELD

The present disclosure relates generally to computer networks, and, more particularly, to multiple spanning tree (MST) instances of bridges in computer networks.

BACKGROUND

A bridge (or switch) may be used to provide a "bridging" or ("switching") function between two or more local area networks (LANs) or end stations. Typically, the bridge is a computer and includes a plurality of ports that is coupled via LANs either to other bridges, or to end stations such as routers or host computers. To avoid the formation of loops, most bridges and switches execute a spanning tree protocol which allows them to calculate an active network topology that is loop-free (i.e., a tree) and yet connects every pair of LANs within the network (i.e., the tree is spanning). To obtain the information necessary to run the spanning tree protocol, bridges exchange special messages called configuration bridge protocol data unit (BPDU) messages or simply BPDUs. In addition, as will be understood by those skilled in the art, the network may be configured with one or more virtual local area networks (VLANs), generally sharing one spanning tree.

In certain networks, a multiple spanning tree (MST) protocol (MSTP) may be used to allow for multiple instances of spanning trees for different VLANs (that is, each VLAN is assigned to a particular spanning tree instance). Conventionally, however, the standardized MST protocol (a standard of the Institute of Electrical and Electronics Engineers, or the "IEEE", namely, 802.1Q-2005) does not allow a bridge to send control traffic (BPDUs) on a per-VLAN basis. Instead, IEEE standard MSTP currently requires control traffic to be sent on a per-physical link/port basis. As such, a single BPDU representing multiple STP instances and thus multiple VLANs is typically sent from each port of a bridge.

A link that interconnects a switch/bridge into a device (e.g., service devices, such as firewalls) that does bridging between VLANs and then back into the same switch is viewed by the MST protocol as a simple looped-back link, particularly due to the BPDUs (and their association with each of the VLANs) being sent out and received back at the same port. Accordingly, the switch disables or "blocks" the looped ports from each other (that is, to prevent looping traffic from the switch to itself), as will be understood by those skilled in the art.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a first port of a bridge is configured for a first spanning tree (ST) and not a second ST, while a second port of the bridge is configured for the second ST and not the first ST. A multiple ST (MST) bridge protocol data unit (BPDU) for the first and second STs may be generated for both the first and second ports, the MST BPDU having a first portion corresponding to the first ST and a second portion corresponding to the second ST. In order to translate MST instances between the port (e.g., externally or internally interconnected), the second portion (i.e., for the second ST) is stripped from the MST BPDU of the first port, and the first portion (i.e., for the first ST) from the MST BPDU of the first port is associated with the second ST (e.g., is labeled as though it were the second ST). Conversely, the first portion is stripped from the MST BPDU of the second port, and the second portion from the MST BPDU of the second port is associated with the first ST. In this manner, traffic may be switched between the first and second ports of the same bridge without being blocked.

Description

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data packets or frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. Typically, the bridge is a computer and includes a plurality of ports that are coupled via LANs either to other bridges, or to end stations such as routers or host computers. Ports used to couple bridges to each other are generally referred to as trunk ports, whereas ports used to couple bridges to end stations are generally referred to as access ports. The bridging function includes receiving data from a sending entity at a source port and transferring that data to at least one destination port for forwarding to one or more receiving entities. Notably, a bridge may also be referred to as a "switch", each of these configured to provide a "switching" function between two or more LANs or end stations, and both terms may be used interchangeably herein.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (presently IEEE Std. 802.1D-2004) that defines a spanning tree protocol to be executed by 802.1D compatible devices. In general, by executing the 802.1D spanning tree protocol, bridges elect a single bridge within the bridged network to be the "Root Bridge." The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Virtual Local Area Networks

A computer network may also be segmented into a series of logical networks. For example, according to an arrangement for associating any port of a switch with any particular network segment, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2005 specification standard disclose appending a VLAN identifier (VID) field to the corresponding frames. In addition, there exists an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Within the IEEE Std. 802.1Q-2005, the IEEE also included a specification standard for a Spanning Tree Protocol that is specifically designed for use with networks that support VLANs. The Multiple Spanning Tree (MST) Protocol (MSTP), which is described in the IEEE Std. 802.1Q-2005, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-2005 compatible bridges running STP or Rapid STP (RSTP). The IST of a given MST Region receives and sends BPDUs to the CST. Accordingly, all bridges of the bridged network are connected by a single Common and Internal Spanning Tree (CIST). From the point of view of legacy or IEEE Std. 802.1Q-2005 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level, and a VLAN mapping table that associates each of many, e.g., potential 4096, VLANs to a corresponding MSTI. Each bridge, moreover, loads its MST Configuration ID into the BPDUs sourced by the bridge. Because bridges only need to know whether or not they are in the same MST Region, they do not propagate the actual VLAN-to-MSTI tables in their BPDUs. Instead, the MST BPDUs carry only a digest of the VLAN to MSTI table or mappings. The digest is generated by applying a well-known hashing algorithm, e.g., the MD-5 algorithm, to the VLAN to MSTI table. When a bridge receives an MST BPDU, it extracts the MST Configuration ID contained therein, including the digest, and compares it with its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

Virtual Bridges

Spanning Tree Protocols (STPs) generally send a single control message (BPDU) for each physical port (link/interface). As such, the states of any configured VLANs of the network (e.g., up to 4096 or 4K VLANs as in 802.1Q) depend on the topology computed by the use of this single BPDU. In the case of STP and RSTP, a single topology is computed in the whole network (the L2 domain), and all configured VLANs are implicitly mapped to this topology. In MSTP, however, several topologies may be computed, and the configured VLANs are explicitly mapped to a given topology (an MST instance). Because of this explicit mapping, MSTPs maintain a knowledge of the existence of all the configured VLANs (e.g., up to 4K); accordingly, it becomes relatively complex to support more and more VLANs in this manner (e.g., greater than 4K).

Virtual bridges offer a clean and simple solution to the existence of greater numbers of VLANs (e.g., greater than 4K) in a network, particularly for MSTP networks. In particular, a switch may be split into several instances of virtual bridges, where each virtual bridge operates (in the control plane) as though it were a separate physical switch/bridge. Accordingly, virtual bridges may be used to support more than 4K VLANs on a single switch, as each virtual bridge may separately support up to 4K VLANs. Notably, VLANs may be assigned to particular ports of a bridge, or said differently, ports may be assigned to particular VLANs.

Generally, a virtual bridge may be configured with a plurality of attached physical ports. Each physical port (or interface) of a switch is conventionally assigned (e.g., manually) to a single virtual bridge. However, in certain situations, virtual bridges may share a physical port to allow a switch to mix VLANs (and bridge domains) belonging to different virtual bridges on the same port, such as disclosed in commonly-owned, co-pending U.S. patent application Ser. No. 11/499,556, entitled A TECHNIQUE FOR SHARING A PHYSICAL PORT AMONG A PLURALITY OF VIRTUAL BRIDGES ON A SWITCH IN A COMPUTER NETWORK, filed on Aug. 4, 2006 by Francois Tallet, et al.

Network Architecture

Figure 1:
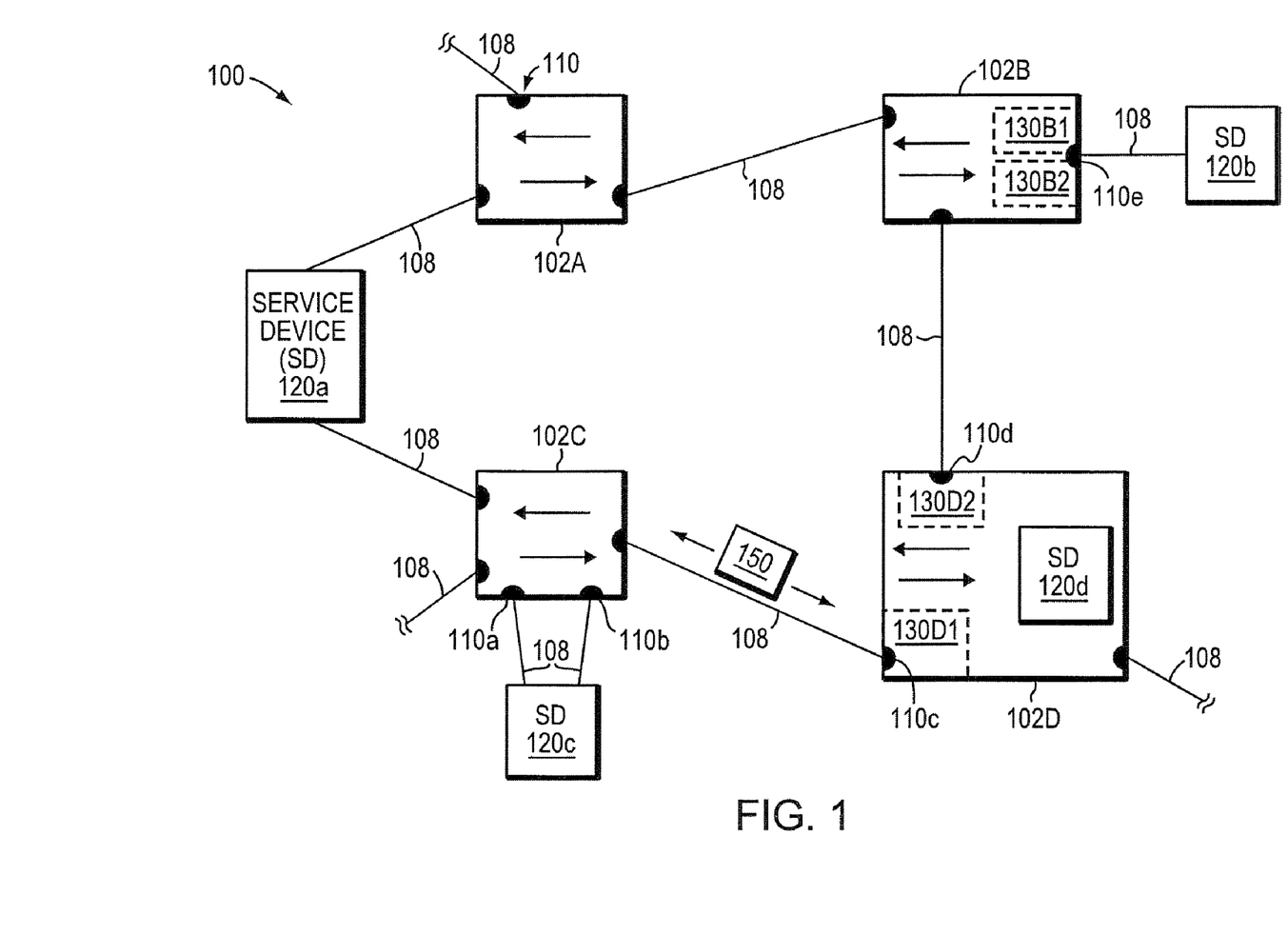
FIG. 1 illustrates an example computer network.

FIG. 1 is a highly schematic block diagram of an illustrative computer network 100 in which the present invention may be advantageously employed. Network 100 includes a plurality of interconnected intermediate network devices 102A-D, which are illustratively switches/bridges, conforming to IEEE Std. 802.1D-2004 and IEEE Std. 802.1Q-2005. Attached to the switches 102A-D may be network entities, such as local area networks (LANs) and/or end stations. In particular, workstations and servers may be directly attached to the bridges (not shown), as well as one or more service devices 120 (e.g., in different manners as described herein as 120a-d). The switches 102, moreover, are interconnected by a plurality of links 108, which may be shared media/segments or point-to-point links/segments.

Each switch 102 has a plurality of ports 110 for receiving and forwarding messages/traffic (150) across the network 100. The ports of each switch 102, moreover, may be identified, e.g., by port numbers, such as a Port 0 (P0), Port 1 (P1), Port 2 (P2), etc., so that the entities that can be reached by a respective switch can be associated with the particular port used to reach them. Switch ports that are coupled directly to end stations or LANs and to which no neighboring switch is coupled are referred to as "access ports" or User-Network Interface (UNI) ports. Switch ports 110 that connect to another intermediate network device, e.g., to a neighboring switch, are referred to as "trunk ports."

It should be understood that the network 100 of FIG. 1 is meant for illustrative purposes only, and that the present invention will operate with other networks having possibly far more complex topologies.

As shown, network 100 includes a loop. Execution of a spanning tree protocol, such as the STP defined in IEEE Std. 802.1D-2004, prevents loops by defining a loop-free topology (i.e., an active topology) in the bridged network 100. It also allows the ports 110 that are part of the active topology to transition rapidly to a forwarding state so that network messages can be forwarded with minimal disruption and/or delay. Furthermore, execution of the MSTP, as defined in IEEE Std. 802.1Q-2005, establishes a plurality of active topologies, each associated with a MSTI. However, as set forth above, IEEE Std. 802.1Q-2005, including the MSTP, supports at most $2^{12}$ or 4K different VLANs (or broadcast/bridge domains). In some network situations, it is desirable to define more than 4K bridge domains, but still run a multiple spanning tree protocol. The present invention helps to achieve this objective.

Figure 2:
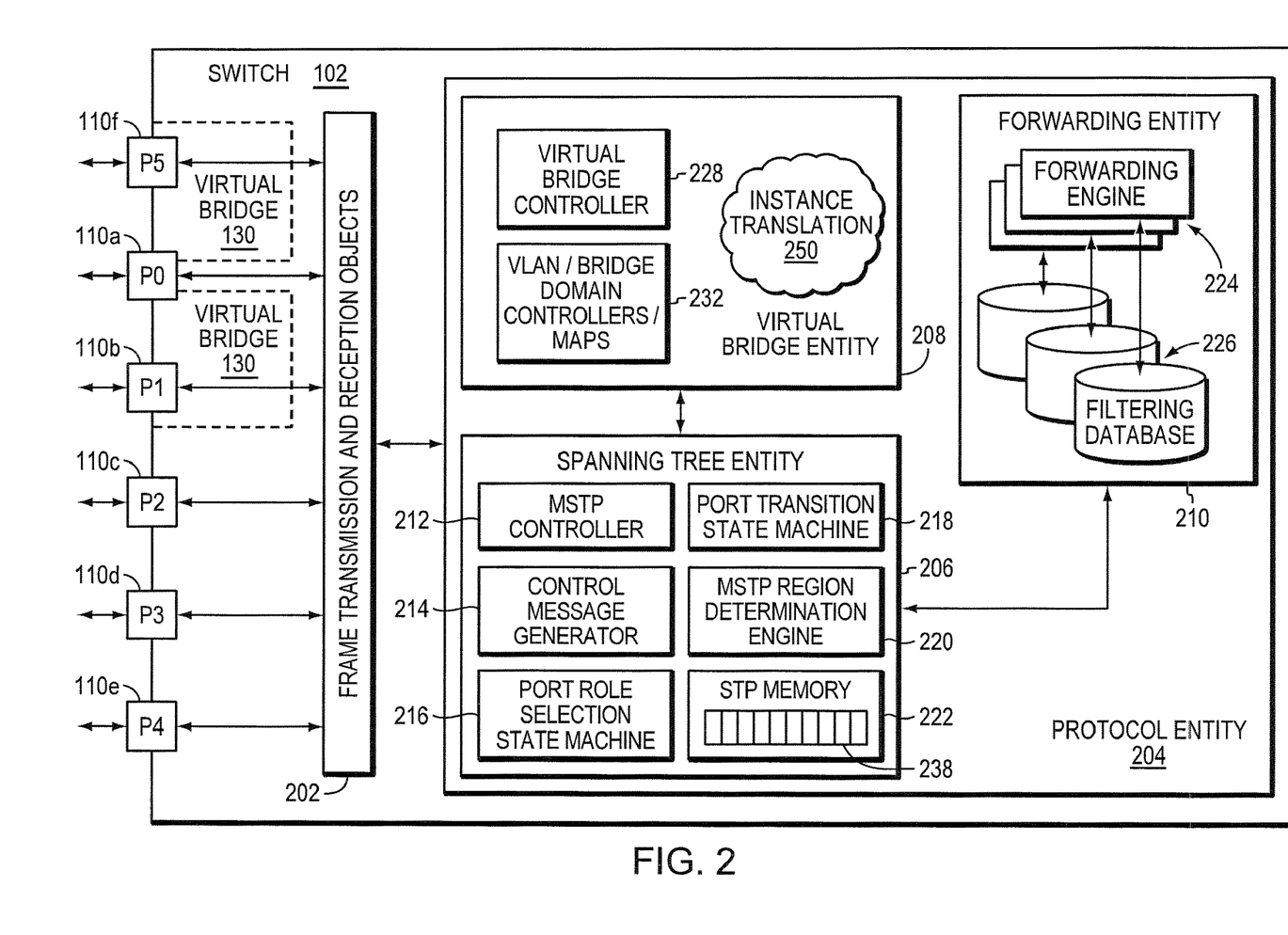
FIG. 2 illustrates an example network bridge/switch.

FIG. 2 is a partial, highly schematic block diagram of switch 102. As indicated above, the switch has a plurality of ports 110 (e.g., a-f) each of which is preferably identified by a number (e.g., P0-P5). Switch 102 further includes one or more frame transmission and reception objects, designated generally 202 that are associated with the ports 110 such that network messages 150, including data traffic and control messages/frames, received at a given port, e.g., P1, may be captured, and frames to be transmitted by switch 102 may be delivered to a given port, e.g., P2. Frame reception and transmission objects 202 are preferably message storage structures, such as priority queues.

Switch 102 further includes at least one protocol entity 204 that is in communicating relationship with the frame transmission and reception objects 202, and that comprises a plurality of components. In particular, the protocol entity 204 includes at least one spanning tree entity 206, a virtual bridge entity 208, and a forwarding entity 210. The spanning tree entity 206 preferably comprises a plurality of subcomponents, including an MSTP controller 212, a control message generator 214, a port role selection state machine 216, a port transition state machine 218, an MSTP region determination engine 220, and an STP memory 222. Memory 222 is preferably organized to include a plurality of records or cells 238 for storing spanning tree related information or parameters, such as the bridge's numeric bridge ID, the assigned path cost for each port 110a-f, the current or "best" spanning tree information for each port P0-P5, etc. Memory 222 may be a volatile and/or non-volatile random access memory (RAM) or some other memory device.

The forwarding entity 210 includes one or more forwarding engines 224. Each forwarding engine 224 is preferably coupled to a corresponding filtering database 226 that stores address information corresponding to the entities of network 100 (FIG. 1). Each filtering database 226 preferably has a plurality of records (not shown) each containing a plurality of cells, including a destination address cell, a destination port cell and a corresponding timer cell. Each record in the filtering databases 226 preferably corresponds to a particular network entity.

The forwarding engines 224 are configured to switch or bridge messages, such as packets and/or frames, from a source port 110 to one or more destinations ports 110 depending on information contained in the appropriate forwarding database 226, and also depending on the spanning tree port states of the respective ports 110, as managed by spanning tree entity 206, and on the VLANs (and/or bridge domains) established at the ports. The forwarding entity 210 is in communicating relationship with the spanning tree entity 206, and may relay control messages, such as MSTP BPDU control messages, received at ports 110 thereto.

The virtual bridge entity 208 also includes a plurality of subcomponents. In particular, the virtual bridge entity 208 preferably includes one or more virtual bridge controllers 228, and VLAN (and/or bridge domain) controllers (/maps) 232. Virtual bridge controllers 228 may be used in accordance with the techniques described in accordance with the present invention, e.g., to control/manage virtual bridges 130 configured at the ports 110 (e.g., shown also in FIG. 1), and to act as default virtual bridges to which all ports 110 may belong. Also, the VLAN controllers 232 may be used for, e.g., tagging messages to be sent from bridge 102 with a VLAN ID, and for examining the VLAN IDs of received messages, etc., as will be understood by those skilled in the art. In addition, an instance translation process/service 250 may be included with the virtual bridge entity 208, as described in accordance with one or more embodiments herein.

Those skilled in the relevant art will understand that the virtual bridge entity 208 may be disposed at other locations. For example, it may be distributed across the ports 110a-f (e.g., at each virtual bridge 130) or subsumed in the spanning tree entity 206. Those skilled in the relevant art will further understand that switch 102 and protocol entity 204 may include other entities and engines. The virtual bridge entity 208 may also be configured with additional subcomponents, not shown for clarity.

Figure 3:
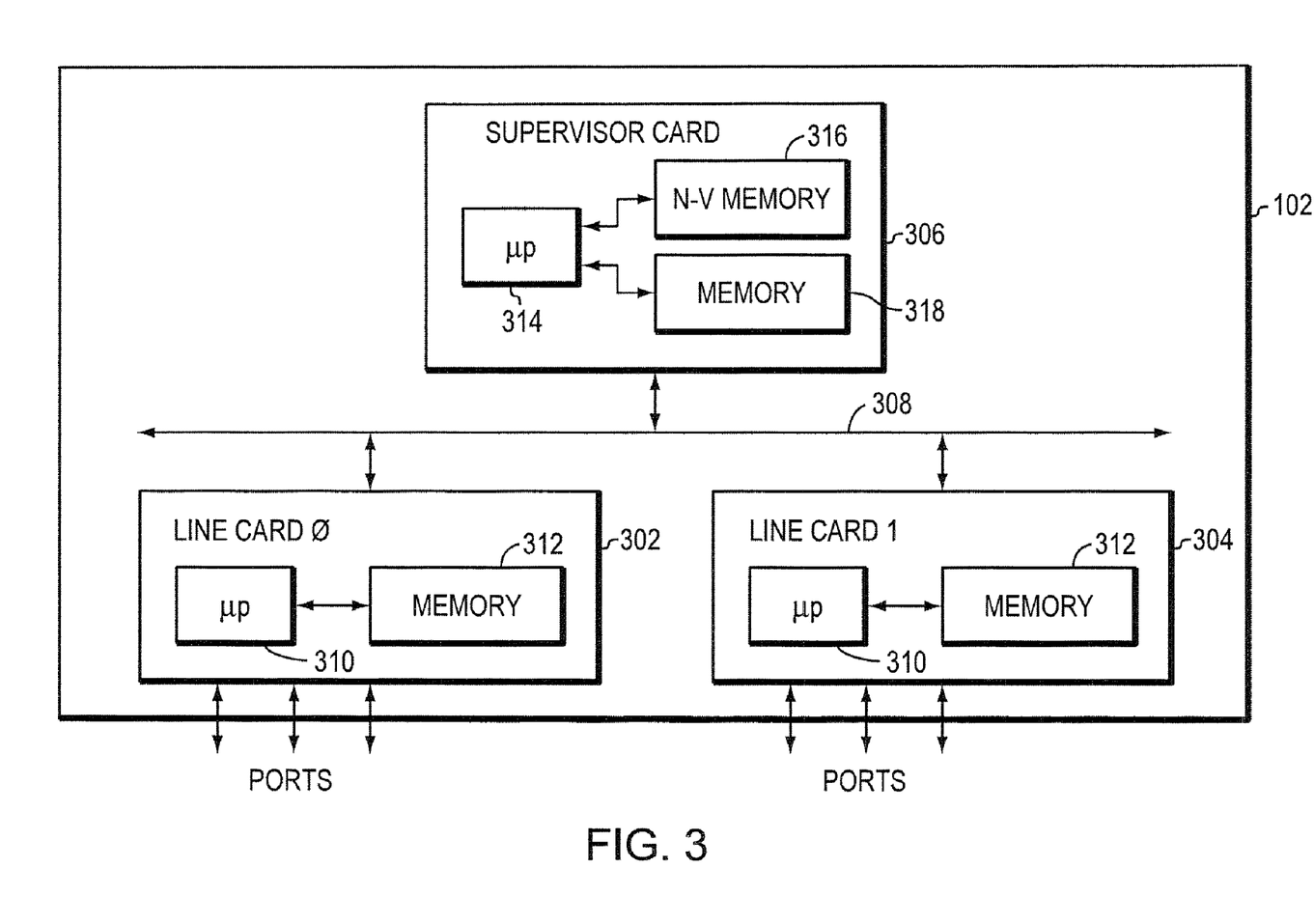
FIG. 3 illustrates another example network bridge/switch.

In the illustrated embodiment, switch 102 includes transmitting and receiving circuitry (e.g., hardware), including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 3 is another highly schematic, partial block diagram of switch 102 illustrating such components. As shown in FIG. 3 switch 102 includes a plurality of line cards 302 and 304, and a supervisor card 306. Cards 302, 304, and 306 are in communicating relationship with each other through a communication bus 308. Each of the line cards 302 and 304 includes a microprocessor (μP) 310 and at least one memory 312. The supervisor card 306 also includes a μP 314, as well as both a non-volatile (N-V) memory 316 and a volatile memory 318, e.g., RAM.

Referring again to FIG. 2, it will be understood by those skilled in the art that the spanning tree entity 206, the virtual bridge entity 208, and the forwarding entity 210 may each comprise registers and combinational logic configured and arranged to produce sequential logic circuits. In the illustrated embodiment, the spanning tree entity 206, the virtual bridge entity 208, and the forwarding entity 210 are preferably software modules or libraries containing program instructions pertaining to the methods described herein and executable by one or more processing elements, such as the microprocessors 310 and/or 314 (FIG. 3), of switch 102. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available series of switches from Cisco Systems, Inc. of San Jose, Calif., such as the Catalyst 6500, 7600, 3500, and GRS.

Figure 4:
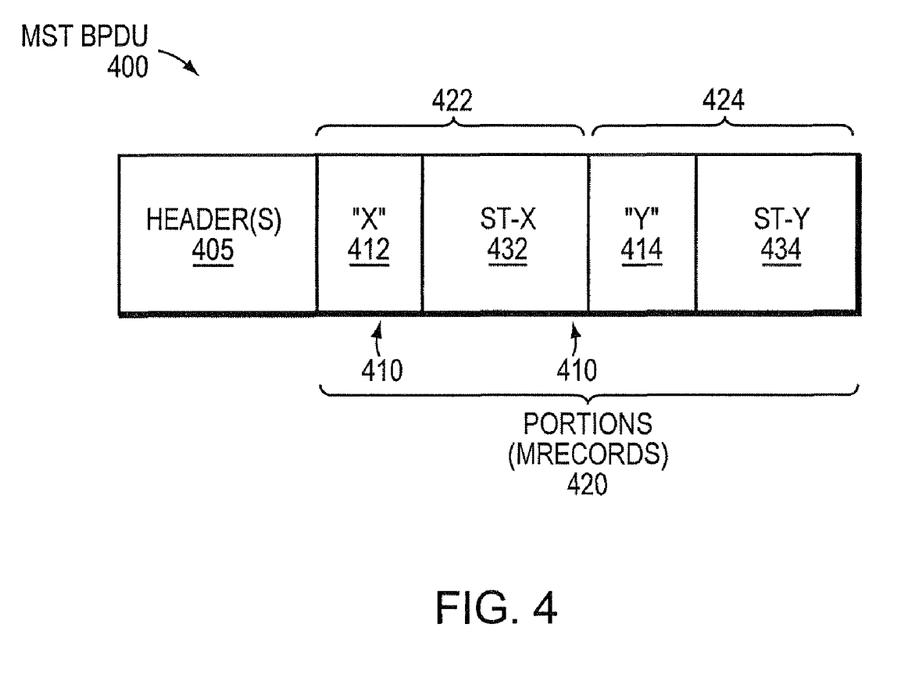
FIG. 4 illustrates an example MST BPDU.

FIG. 4 illustrates a simplified example of a BPDU 400 (an MST BPDU) in accordance with one or more embodiments described herein. In particular, a BPDU 400 may comprise one or more conventional headers 405 and one or more portions ("MRecords") that carry spanning tree instances generally noted as 420 (e.g., 422 and 424), adapted to carry the messages, attributes and the BPDU, as will be understood by those skilled in the art. Also, because the BPDU carries multiple spanning tree instances, each portion 420 also contains a "tag" (or instance ID) 410 identifying the spanning tree instance within that portion (e.g., 412 "X" and 414 "Y" for instances "ST-X" and "ST-Y", respectively). In addition, data (430) containing the spanning tree instances are also contained within the BPDU 400, such as 432 for "ST-X" and 434 for "ST-Y", as will be appreciated by those skilled in the art.

As noted, in certain networks, an MST protocol may be used to allow for multiple instances of spanning trees for different VLANs (that is, each VLAN is assigned to a particular spanning tree). For example, various proprietary bridging systems/networks are configured to utilize "per-VLAN" BPDUs, such that each BPDU sent from a bridge corresponds to a single VLAN (a single spanning tree). In such a configuration, the per-VLAN BPDUs follow the flow of traffic for that VLAN. Conventionally, however, the standardized MST protocol (IEEE 802.1Q-2005) does not allow a bridge to send control traffic (BPDUs) on a per-VLAN basis. Instead, IEEE standard MSTP currently requires control traffic to be sent on a per-physical link/port basis. As such, a single BPDU representing multiple VLANs (as in FIG. 4) is typically sent from each port of a bridge.

Many service devices (120), such as firewalls, intrusion detection systems (IDSs), traffic load-balancers, etc., bridge between VLANs. In other words, the service devices receive traffic on a given VLAN (e.g., an unprotected VLAN), perform a service operation on the traffic (e.g., firewalling), and re-inject this traffic back into the network on a different VLAN (e.g., a firewall protected VLAN). A link that interconnects a switch/bridge into a device (e.g., service devices, such as firewalls) that does bridging between VLANs and then back into the same switch is viewed by the MST protocol as a simple looped-back link, particularly due to the BPDUs (and their association with each of the VLANs as indicated by (portions 422 and 424) being sent out and received back at the same port. In particular, both ports send out the same BPDU with ST-X and ST-Y. Accordingly, the switch disables or "blocks" the looped ports from each other (that is, to prevent looping traffic from the switch to itself). Currently, the IEEE MST protocol solution is to utilize two separate physical bridges with a service device between them (e.g., bridges 102A and 102C with service device 120a). The use of a second switch/bridge is inefficient (three devices), particularly where the same function could be performed by a single switch and a service device (two devices), or a single switch with an internal service device (one device), such as available currently only through use of proprietary protocols. There remains a need, therefore, to allow for bridging between MST instances (VLANs) at a single switch in accordance with the IEEE standard MSTP.

Translating MST Instances Between Ports of a Bridge

According to embodiments of the disclosure, a first port of a bridge is configured for a first spanning tree (ST) and not a second ST, while a second port of the bridge is configured for the second ST and not the first ST. An MST BPDU for the first and second STs may be generated for both the first and second ports, the MST BPDU having a first portion corresponding to the first ST and a second portion corresponding to the second ST. In order to translate MST instances between the port (e.g., externally or internally interconnected), the second portion (i.e., for the second ST) is stripped from the MST BPDU of the first port, and the first portion (i.e., for the first ST) from the MST BPDU of the first port is associated with the second ST (e.g., is labeled as though it were the second ST). Conversely, the first portion is stripped from the MST BPDU of the second port, and the second portion from the MST BPDU of the second port is associated with the first ST. In this manner, traffic may be switched between the first and second ports of the same bridge without being blocked.

In an illustrative embodiment, instance translation process/service 250 contains computer executable instructions executed by each processor 310 to perform functions related to the techniques described herein to translate MST instances between ports of a bridge. In particular, the instance translation process 250 (notably, of bridge 102 as shown or of each of a plurality of virtual bridges 130) may be configured to perform the stripping and/or associating, as described herein.

Operationally, a first port 110.1 (e.g., P1) of a bridge 102 is configured for a first ST (e.g., ST-X) and not a second ST (e.g., ST-Y), while a second port 110.2 (e.g., P5) of the bridge is configured for the second ST-Y and not the first ST-X (note that "110.1" and "110.2" do not appear in the figures explicitly, but are meant to distinguish between two ports 110). For instance, the first ST-X may represent a first VLAN "X" (or, said differently, a first VLAN is mapped to the first MST instance) and the second ST-Y may represent a second VLAN "Y" (or, a second VLAN is mapped to the second MST instance). For example, as may be appreciated by those skilled in the art, the bridge 102 may be a first virtual bridge 130.1 for the first VLAN "X" and a second virtual bridge 130.2 for the second VLAN "Y" (note, again, that "130.1" and "130.2" are meant to distinguish between two virtual bridges). Also, as mentioned above, MST BPDUs 400 may be generated for the first and second STs (ST-X and ST-Y) for both the first and second ports (as in FIG. 4 above).

Figure 5A:
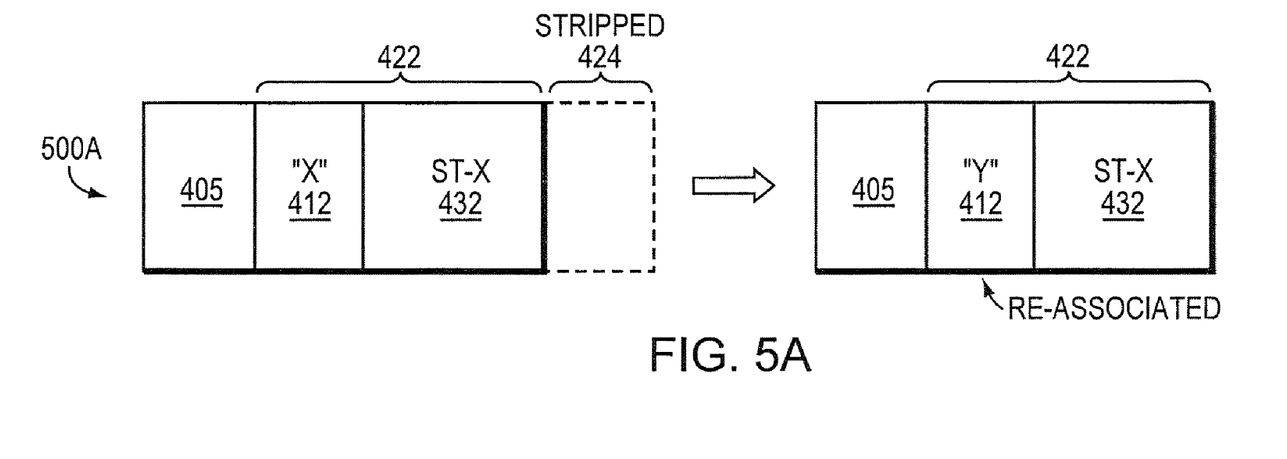
FIGS. 5A-B illustrate example manipulated MST BPDUs.
Figure 5B:
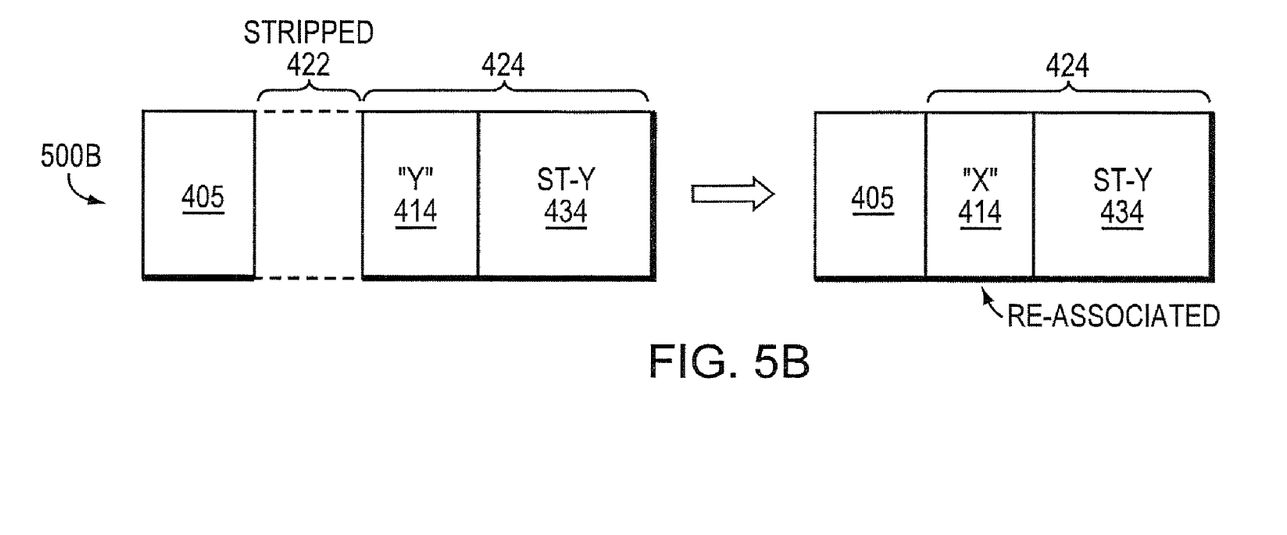

In accordance with one or more embodiments described herein, the second portion 424 may be stripped (removed) from the MST BPDU 400 of the first port, and the first portion 422 may be stripped from the MST BPDU 400 of the second port. For instance, FIGS. 5A-B illustrate MST BPDUs 500A and 500B for the first and second ports, respectively. In particular, BPDU 500A shows BPDU 400 after having stripped ST-Y (portion 424), while BPDU 500B shows BPDU 400 after having stripped ST-X (portion 422).

In addition, the first portion (MRecord) 422 from the MST BPDU 500A of the first port 110.1 may be associated with the second ST-Y, and the second portion (MRecord) 424 from the MST BPDU 500B of the second port 110.2 may be associated with the first ST-X. In particular, to associate (re-associate) the portions 420 of the BPDU, respective tags 410 corresponding to the portions may be manipulated/adjusted (changed) to identify the appropriate spanning tree instance (VLAN). For instance, referring again to FIGS. 5A-B, BPDU 500A illustrates the first portion 422 after having associated ST-X with ST-Y (tag 412 changed from "X" to "Y"), while BPDU 500B illustrates the second portion 424 after having associated ST-Y with ST-X (tag 414 changed from "Y" to "X"). (Note that while the stripping and associating are shown in succession for both the first and second ports, each port may independently strip and associate the portions from the other port, and the stripping and associating need not occur in any particular order, e.g., associating then stripping the unassociated portion.)

Once each proper portion (MRecord) 420 is stripped from the BPDUs and associated with the respective ST (VLAN), each port 110 of the bridge 102 may transmit the MST BPDUs 500 between the first and second ports. For instance, the first port 110.1 (configured for ST-X) transmits the first BPDU 500A having an MRecord for ST-X (indicated as "Y") toward the second port 110.2 (configured for ST-Y). Conversely, the second port 110.2 transmits the second BPDU 500B having an MRecord for ST-Y (indicated as "X") toward the first port 110.1. Note that illustratively, the ports configured to perform the techniques described herein are interconnected via a service device 120. As such, the service device forwards the BPDUs to the respective other port, accordingly. As mentioned above the service devices may be a firewall, an IDS, a load-balancer, etc., as will be appreciated by those skilled in the art.

FIGS. 6A-6D illustrate example BPDU message exchanges 600 in accordance with the embodiments described herein. For example, in FIG. 6A, external physical ports 110a and 110b of bridge 102C are interconnected externally via service device 120c, and messages 500A and 500B may be exchanged accordingly. Also, however, as in FIG. 6B, first and second ports may be interconnected internally within the bridge, such as ports 110c and 110d of bridge 102D (e.g., virtual bridges 130D1 and 130D2). For instance, certain bridges may have service "blades" or portions dedicated to providing services (e.g., a firewall module within a switch). Accordingly, the messages 500A and 500B may be switched between two virtual bridges within the physical bridge, via the internal service device (e.g., 120d).

Figure 6A:
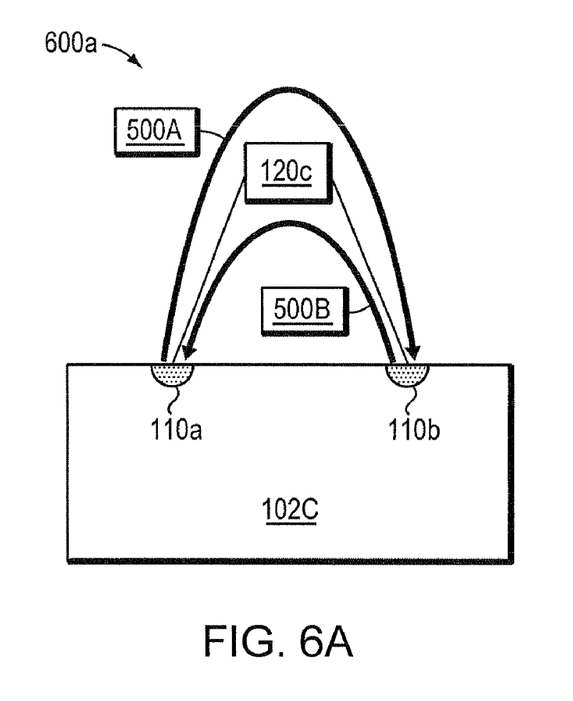
FIGS. 6A-D illustrate example BPDU message exchanges.
Figure 6B:
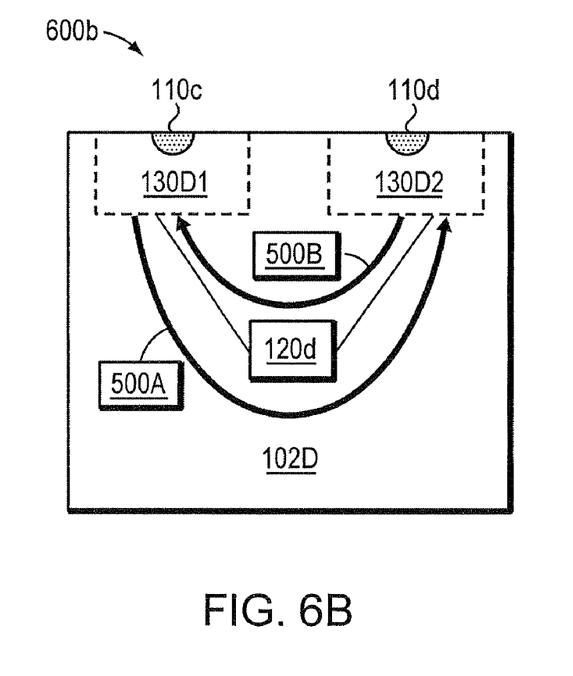
Figure 6C:
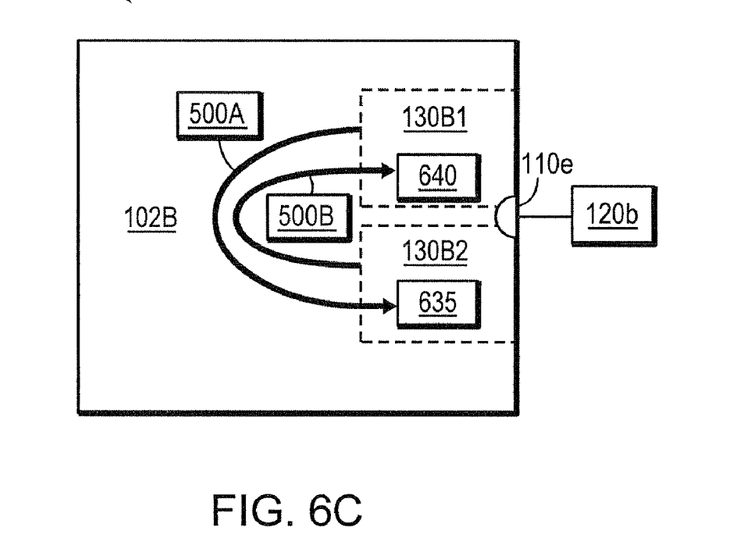

As still another example, a service device may be connected by a single port, or "trunk", such as either internally or externally (e.g., a "device on a stick", as will be understood by those skilled in the art). For instance, physical port 110e of bridge 102B is interconnected with service device 120b as a trunk port. As such, the physical port 110e acts as the first and second ports, e.g., each of the first and second port operated by a first and second virtual bridge (130B1 and 130B2) adapted to share the physical port 110e. If the first and second ports are a trunk port, the MST protocol can conventionally only send/receive BPDUs in the native VLAN. As a result, the BPDU needs to be received on the same VLAN that it was sent on (e.g., out on VLAN "X", and in on VLAN "X"). This may thus require special support on a service device/card that was previously configured to translate VLANs (e.g., from VLAN "X" to VLAN "Y"). Generally, the physical port 110e may have separate queues for each of the virtual bridges (or virtual first and second ports). Accordingly, rather than transmit the MST BPDUs from the same physical port, the manipulated MST BPDU 500A for the first port (virtual bridge 130B1) may be inserted directly (internally) into a receive queue 635 of the second port (virtual bridge 130B2), and the manipulated MST BPDU 500B for the second port may be inserted into a receive queue 640 of the first port. This way, the BPDUs appear as though they were transmitted and received properly, are illustrated in FIG. 6C. (Notably, as may be appreciated by those skilled in the art, trunked ports/links may already require that certain MST instances be stripped from BPDUs, e.g., ST-Y; however, associating the remaining MST instances with the stripped MST instances for the translation described herein is not currently performed, e.g., ST-X to ST-Y, and vice versa.)

Figure 6D:
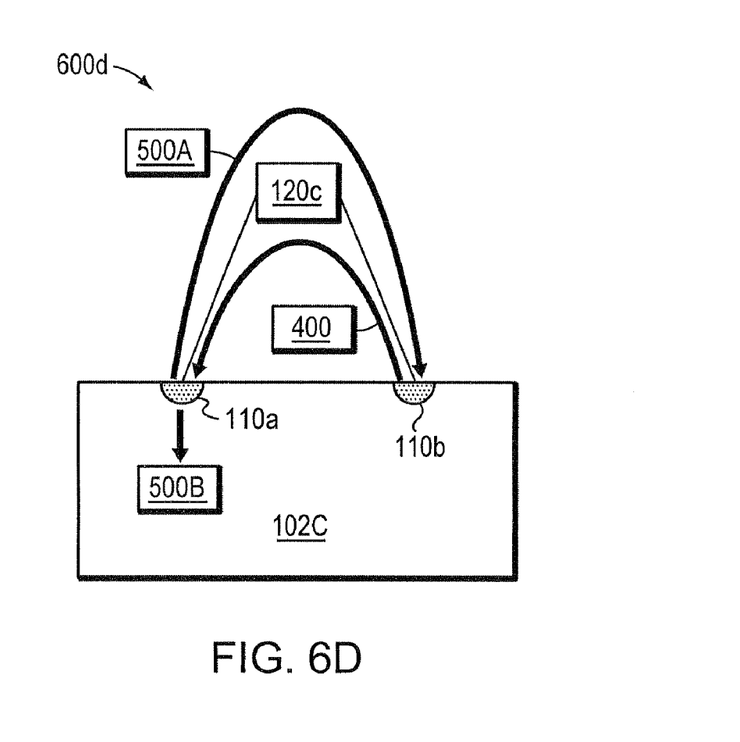

Notably, the above techniques describe a "half-duplex" arrangement, in that the stripping and associating for the first and second ports are performed on the first and second ports, respectively. That is, both ports (the first 110.1 and second 110.2) each perform its portion of the technique. According to one or more other embodiments, however, a "full-duplex" arrangement may also be implemented, in that the stripping and associating for the first and second ports are performed on one of either the first or second port, i.e., one port performs both tasks. In other words, the above techniques describe egress MRecord translation (configured action on both ports), where each port performs the respective technique before transmitting the BPDUs. On the other hand, other embodiments may configure a single port to perform egress and ingress MRecord translation, where that single port strips and associates MST instances (MRecords) for both BPDUs transmitted to and received from the other port, accordingly. For example, as shown in FIG. 6D, the first port 110a (of bridge 102C) may strip ST-Y from BPDU 400 and associate ST-X with ST-Y before transmitting the BPDU 500A as described above. In addition, in a full-duplex arrangement, the second port 110b transmits BPDU 400 with both MRecords (ST-X and ST-Y), and upon receipt, the first port strips ST-X from the BPDU 400, and associates ST-Y with ST-X, accordingly (as BPDU 500B). In this manner, only a single port need be configured to perform the novel techniques.

Upon receiving the manipulated BPDUs 500, or, in full-duplex, after receiving and manipulating a BPDU, each port (110.1 and 110.2) of the bridge 102 (or each virtual bridge 130) may update the corresponding spanning tree, accordingly. As will be appreciated by those skilled in the art, the spanning tree protocols are run on the physical bridge, not on each individual port or virtual bridge. By using the techniques described herein, with two virtual bridges on the same physical bridge, the traffic in the network perceives different bridges communicating through a link (e.g., through a service device), and traffic is not blocked due to loops (particularly, because the same VLAN or ST is not transmitted and received at the same port of the bridge).

Again, these techniques are necessary so that in accordance with the IEEE standardized MST protocol, each port does not "see" a returned duplicate MST instance in a BPDU that spans multiple VLANs at the same bridge, and the ports accept (i.e., do not block) the returned translated MST instance. In other words, in brief summary with respect to the first port 110.1, a VLAN "X" mapped to MST instance ST-X that needs to be bridged to VLAN "Y" is mapped to MST instance ST-Y. The MRecord (portion 422) associated with instance ST-X is tagged as if it were ST-Y in the MST BPDUs 500A sent out. Conversely, MRecords associated with instance ST-Y (portions 424) from incoming MST BPDUs 500B are received in instance ST-X. For the first port, no MRecord for instance ST-Y is sent or received (there is no VLAN mapped to this instance active on the first port), and traffic is either sent out of the port or received at the port in VLAN "X" mapped to instance ST-X. Conversely, the same is applied to the second port 110.2, where traffic is either sent out of the second port or received at the second port in VLAN "Y" mapped to instance ST-Y (e.g., bridged between VLANs at a service device 120).

Figure 7:
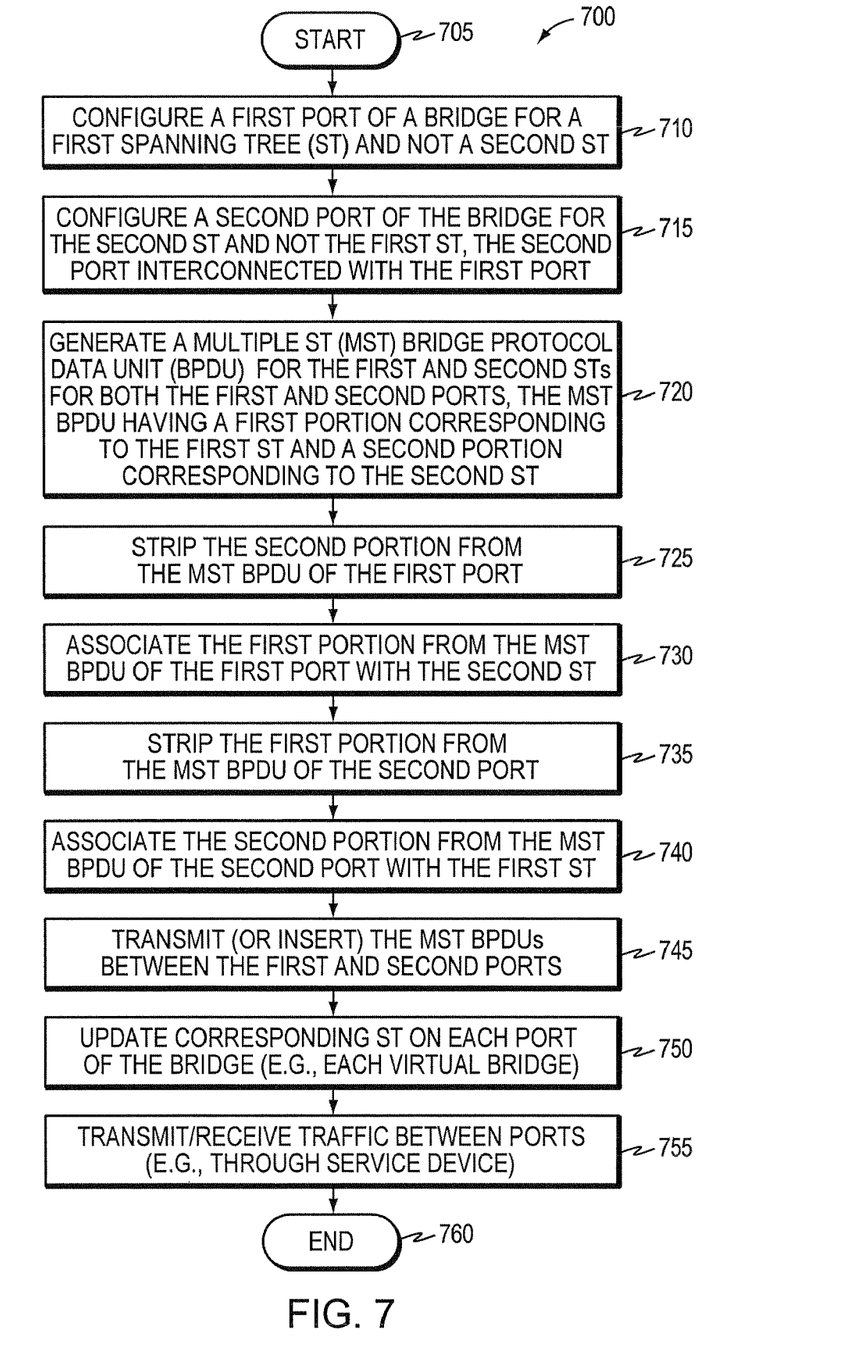
FIG. 7 illustrates an example procedure for translating MST instances between ports of a bridge.

FIG. 7 illustrates an example procedure for translating MST instances between ports of a bridge in accordance with one or more embodiments described herein. The procedure 700 starts at step 705, and continues to step 710, where a first port 110.1 (e.g., 110a) of a bridge 102 (e.g., 102c) is configured for a first ST (e.g., ST-X) and not a second ST (e.g., ST-Y), as described above. Also, in step 715, a second port 110.2 (e.g., 102b) of the bridge 102 is configured for the second ST-Y and not the first ST-X, where the second port is interconnected with the first port (e.g., physically and/or virtually).

In step 720, an MST BPDU (e.g., 400) for the first and second STs is generated for the first and second ports, the MST BPDU having a first portion 422 corresponding to the first ST-X and a second portion 424 corresponding to the second ST-Y. The bridge 102 (e.g., process 250) may then prepare the MST BPDUs 500 by stripping the second portion 424 from the MST BPDU 500A of the first port in step 725, and associating the first portion 422 from the MST BPDU of the first port with the second ST-Y in step 730 (e.g., changing tag 412 from "X" to "Y"). Also, bridge 102 may strip the first portion 422 from the MST BPDU 500B of the second port in step 735, and associate the second portion 424 from the MST BPDU of the second port with the first ST-X in step 740 (e.g., changing tag 414 from "Y" to "X"). The MST BPDUs 500 may then be transmitted (or inserted) between the first and second ports. Notably, as mentioned above, the stripping and associating of each portion 422 and 424 may be performed at each port (110.1 and 110.2, respectively), or at a single port (e.g., 110.1) configured to perform both respective actions (i.e., once to a transmitted BPDU and once to a received BPDU) accordingly.

Upon receiving the respective MST BPDUs 500, each port of the bridge 102 (e.g., each virtual bridge 130) may update the corresponding ST. For example, the first port 110.1 may update ST-X to include the received data (unknowingly from the second ST-Y) while the second port 110.2 may update ST-Y to include the received data (unknowingly from the first ST-X). In step 755, traffic 150 may be transmitted and/or received between the ports, such as through one or more service devices 120 (e.g., internally or externally). The procedure 700 ends in step 760, notably, with the possibility to continue exchanging MST BPDUs 500 and traffic 150.

Advantageously, the novel techniques described herein translate MST instances between ports of a bridge in a computer network. By configuring a bridge to handle MST instances as described above, the novel techniques allow for traffic to be switched between ports of the same bridge (exit and enter the same switch/bridge) without being blocked as a loop, such as through service devices. In particular, the techniques described above may be used in conjunction with the IEEE standardized MSTP, as well as both physical ports/bridges and virtual ports/bridges. Also, dynamic aspects of one or more embodiments described herein (e.g., message handling) alleviate the need for cumbersome and inefficient manual configuration.

While there have been shown and described illustrative embodiments that trans-late MST instances between ports of a bridge in a computer network, it is to be understood that various other adaptations and modifications may be made within the spirit and scope of the present invention. For example, the embodiments have been shown and described herein for compliance with the IEEE standard MST Protocol. However, the embodiments of the invention in their broader sense are not so limited, and may, in fact, be used with other MST Protocols, such as proprietary protocols that may advantageously make use of the techniques described herein. Also, while the embodiments described above illustrate a service device between the ports of the bridge that is configured to bridge between VLANs, other embodiments may utilize the techniques detailed herein to allow for two ports of the same bridge to send and receive the same traffic in different VLANs, such as where the bridge itself bridges between the different VLANs (e.g., internally between two virtual bridges, etc.). Further, while the above techniques describe bidirectional manipulated BPDU message exchange (between first and second ports), the techniques may be used for a single manipulated BPDU, e.g., only from the first port to the second port, and not vise versa. In this instance, traffic from the first port to the second will not be blocked, but traffic from the second port to the first may be blocked (e.g., to prevent transmitting traffic through a firewall in reverse, etc.).

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   configuring a first port of a bridge for a first spanning tree (ST);
   configuring a second port of the bridge for a second ST, the second port interconnected with the first port;
   generating, for the first port, a first multiple ST (MST) bridge protocol data unit (BPDU) for the first and second STs, the first MST BPDU having a first portion corresponding to the first ST and a second portion corresponding to the second ST;
   generating, for the second port, a second MST BPDU for the first and second STs, the second MST BPDU having a first portion corresponding to the first ST and a second portion corresponding to the second ST;
   stripping the second portion from the first MST BPDU of the first port;
   associating the first portion from the first MST BPDU of the first port with the second ST;
   stripping the first portion from the second MST BPDU of the second port; and
   associating the second portion from the second MST BPDU of the second port with the first ST.

2. The method as in claim 1, further comprising:
   performing the stripping and associating for the first port on the first port; and
   performing the stripping and associating for the second port on the second port.

3. The method as in claim 1, further comprising:
   performing the stripping and associating for the first and second ports on one of either the first or second port.

4. The method as in claim 1, further comprising:
   transmitting each MST BPDU between the first and second ports.

5. The method as in claim 1, wherein the first and second ports are a single port, the method further comprising:
   inserting the first MST BPDU for the first port to a receive queue of the second port; and
   inserting the second MST BPDU for the second port to a receive queue of the first port.

6. The method as in claim 1, wherein the first ST represents a first virtual local area network (VLAN) and the second ST represents a second VLAN.

7. The method as in claim 6, wherein the bridge is a first virtual bridge for the first VLAN and a second virtual bridge for the second VLAN.

8. The method as in claim 1, wherein a service device is interconnected between the first and second ports.

9. The method as in claim 8, wherein the service device is selected from the group consisting of: a firewall, an intrusion detection system (IDS), and a load-balancer.

10. The method as in claim 1, wherein the first and second portions are MRecords of each MST BPDU.

11. The method as in claim 1, wherein the first and second ports are interconnected internally within the bridge.

12. An apparatus, comprising:
- a first port configured for a first spanning tree (ST) and not a second ST;
- a second port configured for a second ST, the second port interconnected with the first port;
- a processor coupled to the first and second ports and adapted to execute one or more processes; and
- a memory adapted to store an instance translation process executable by the processor, the instance translation process when executed operable to:
  - generate, for the first port, a first multiple ST (MST) bridge protocol data unit (BPDU) for the first and second STs, the first MST BPDU having a first portion corresponding to the first ST and a second portion corresponding to the second ST;
  - generate, for the second port, a second MST BPDU for the first and second STs, the second MST BPDU having a first portion corresponding to the first ST and a second portion corresponding to the second ST;
  - strip the second portion from the first MST BPDU of the first port;
  - associate the first portion from the first MST BPDU of the first port with the second ST;
  - strip the first portion from the second MST BPDU of the second port; and
  - associate the second portion from the second MST BPDU of the second port with the first ST.

13. The apparatus as in claim 12, wherein the instance translation process operates on the first port for the first MST BPDU for the first port, and also operates on the second port for the second MST BPDU for the second port.

14. The apparatus as in claim 12, wherein the instance translation process operates on one of either the first or second port for the MST BPDU for the first and second ports.

15. The apparatus as in claim 12, wherein the first and second ports are a single port, the apparatus further comprising:
- a first receive queue of the first port;
- a second receive queue of the second port; and
- wherein the instance translation process is further operable to insert the first MST BPDU for the first port to the second receive queue of the second port and to insert the second MST BPDU for the second port to the first receive queue of the first port.

16. The apparatus as in claim 15, wherein the single port is a trunk port of the apparatus.

17. The apparatus as in claim 12, wherein the first ST represents a first virtual local area network (VLAN) and the second ST represents a second VLAN, and the apparatus is a first virtual bridge for the first VLAN and a second virtual bridge for the second VLAN.

18. The apparatus as in claim 12, wherein a service device is interconnected between the first and second ports.

19. The apparatus as in claim 12, wherein the first and second ports are interconnected internally within the apparatus.

20. A method, comprising:
- configuring a first port of a bridge for a first spanning tree (ST) and not a second ST;
- configuring a second port of the bridge for the second ST and not the first ST, the second port interconnected with the first port;
- generating a multiple ST (MST) bridge protocol data unit (BPDU) for the first and second STs for the first port, the MST BPDU having a first portion corresponding to the first ST and a second portion corresponding to the second ST;
- stripping the second portion from the MST BPDU of the first port;
- associating the first portion from the MST BPDU of the first port with the second ST; and
- transmitting the MST BPDUs from the first port to the second port.

* * * * *